March 24, 1931.  L. N. RAHN  1,798,107
CORN PLANTER
Filed Sept. 4, 1925  3 Sheets-Sheet 1
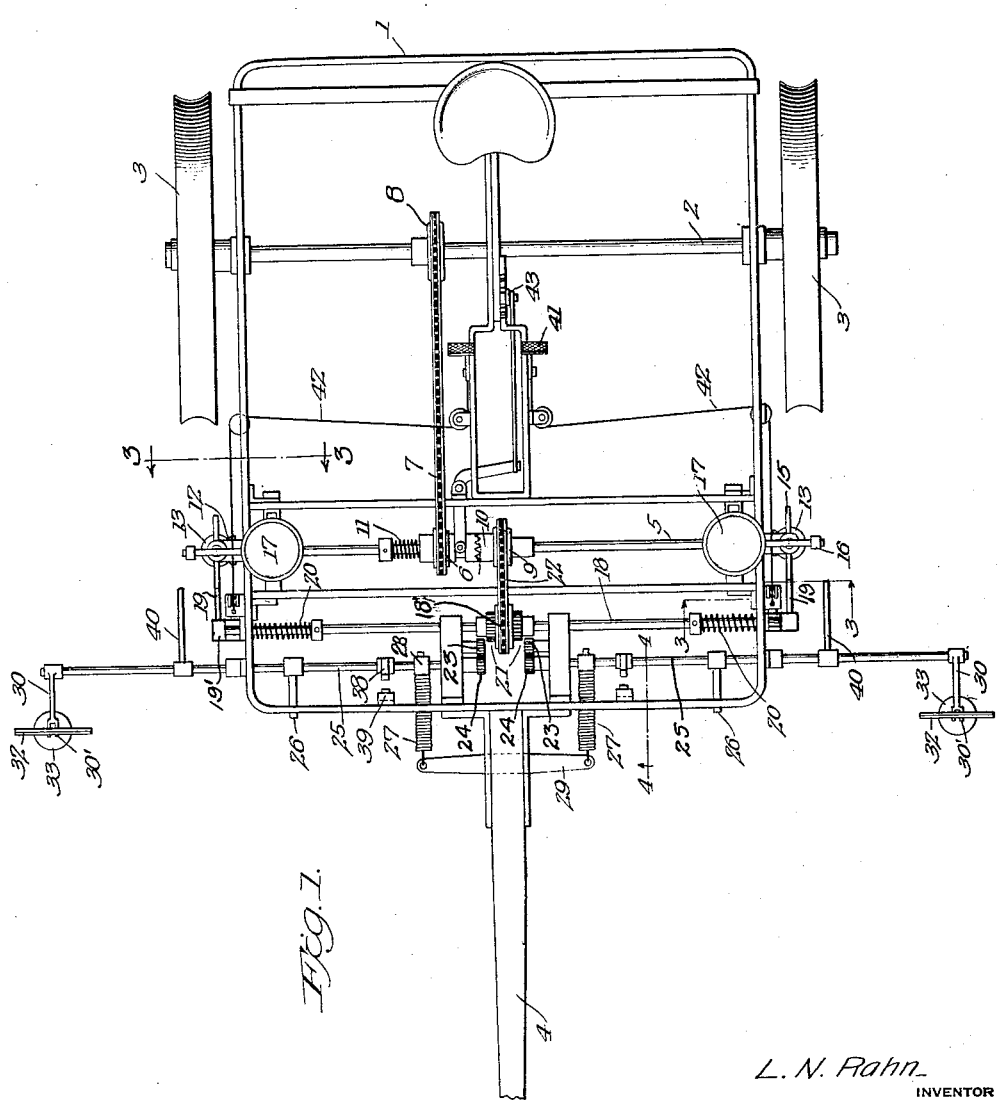

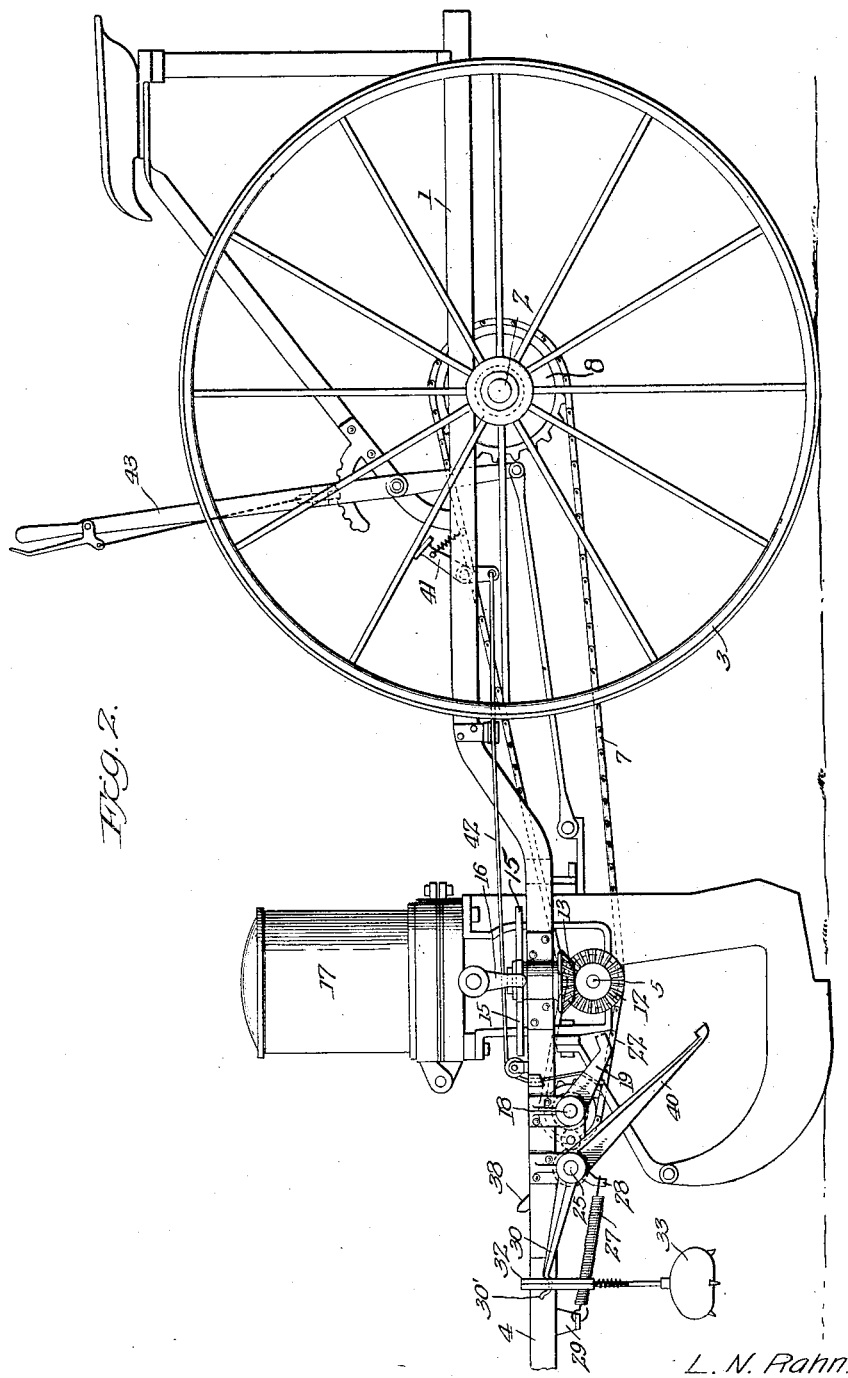

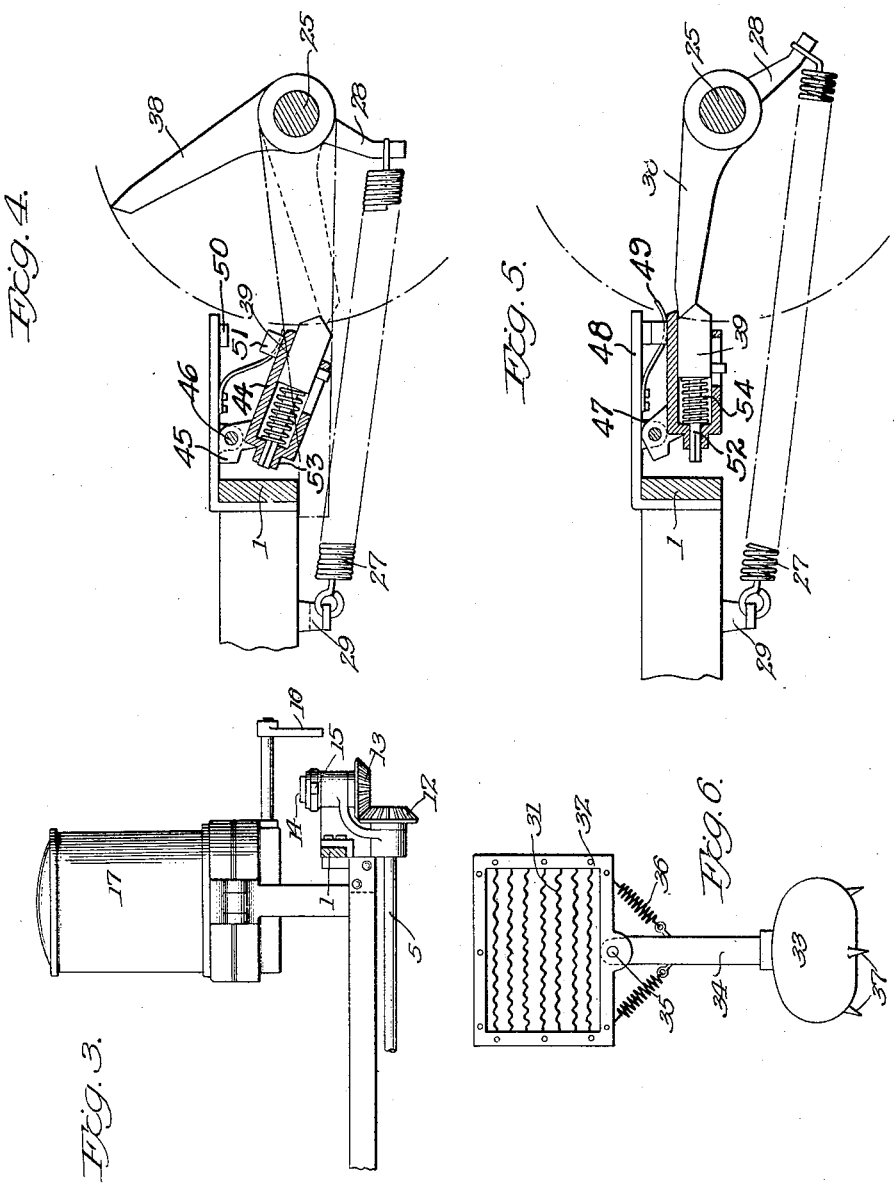

Patented Mar. 24, 1931

1,798,107

UNITED STATES PATENT OFFICE

LLOYD N. RAHN, OF LANARK, ILLINOIS

CORN PLANTER

Application filed September 4, 1925. Serial No. 54,565.

This invention relates to corn planters, and the general object of the invention is to provide a planter designed to drop seeds in parallel rows without the use of a check wire.

Another object of the invention is to provide means for causing the planter to start new rows with hills in alinement with the hills of rows previously planted.

This invention also consists in certain other features of construction and in the combination and arrangement of the several parts, to be hereinafter fully described illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the planter forming the subject matter of the present invention.

Figure 2 is a side elevation thereof.

Figure 3 is a sectional view taken approximately on line 3—3 of Figure 1 looking in the direction of the arrows.

Figure 4 is a sectional view taken through the forward portion of the frame of the planter and illustrating a latch mechanism which forms a part of the present invention in full lines in one of its operative positions and in dotted lines in another operative position.

Figure 5 is a similar view of the latch mechanism in another position.

Figure 6 is a detail view of the dropping weight and its associated structure, which forms a portion of this invention.

Referring to the drawings in detail, the reference numeral 1 indicates the frame of the planter, 2 the axle, 3 the wheels which are secured to the axle for rotating the latter and 4 the tongue. The tongue is secured to the front end of the frame as best shown in Figure 1 of the drawings. A shaft 5 is journaled in appropriate bearings secured to the frame and a sprocket 6 is mounted for rotation on said shaft. The sprocket has trained thereabout a chain 7 which is likewise trained over a sprocket 8 secured to the axle. A sprocket 9 is fixed to the shaft 5, and the sprockets 6 and 9 carry clutch parts 10 for connecting the sprockets together so that movement of the axle will be transmitted to the shaft 5. A coil spring 11 surrounds the shaft 5 and is disposed between parts of the sprockets 6 and a collar secured to said shaft as clearly shown in Figure 1. The spring is adapted to hold the clutch parts in engagement with each other. Secured to the ends of the shaft 5 are gears 12 as best shown in Figures 2 and 3, and these gears 12 mesh with gears 13 secured to the lower ends of shafts 14 mounted in bearings formed with bearings for the shaft 5, and secured to the upper ends of each of the shafts 14 are tappet wheels having tappet arms 15 extending from diametrically opposite sides thereof as clearly shown in Figure 2 of the drawings. These tappet arms 15 are disposed so as to engage arms 16 which are secured to the outer ends of shafts having connection with feed plates of the seed box 17 as suggested in Figure 3. From this construction, it will apparent that every time the tappet arms strike the arms 16 the feed plates will be moved to permit some of the seeds in the seed box to drop into boots of the machine and thus be deposited in the ground in the usual manner.

A shaft 18 is arranged adjacent the forward portion of the frame 1 and is mounted for slidable movement in the side members of the frame. Secured to the ends of the shaft 18 which extend beyond the side members of the frame are arms 19. The arms are secured to the ends of the shaft through the medium of pins 19', and surrounding the shaft 18 are coil springs 20 which have their end convolutions disposed in engagement with the side bars of the frame and the collars as clearly shown in Figure 1 of the drawings. These springs tend to retain the shaft in its normal position. Mounted for rotation on the shaft 18 and held against lateral movement are gears 21 secured upon opposite sides of a sprocket 18' which is likewise mounted on the shaft 18 and is connected with the sprocket 9 by a chain 22. The chain 22 is loose on its sprockets and is of a length to allow free slidable movement of the shaft 18, and still remain in operative position on its sprockets 9 and 18' respectively. The gears 21 are adapted to mesh with gears 23 which are arranged in constant mesh with gears 24 secured on the inner ends of shaft 25 in a manner which will be hereinafter set forth. The shafts 25 are rotatably mounted and pass through the forward portions of the side bars of the front part of the frame 1 as shown in Figure 1 and are mounted in appropriate bearings. The shafts 25 are held in normal position and against rotation in one direction through the medium of stop arms 26 which are fixed thereto and disposed in contacting engagement with the front bar of the frame 1 by springs 27. The springs 27 are connected with arms 28 secured on the shafts 25, and with the ends of a cross piece 29 secured to the tongue as best shown in Figures 1, 4 and 5 of the drawings. Each shaft 25 has secured to its outer end an arm 30, and formed with the arms 30 are forked hooks disposed on their free ends and are adapted to engage in one of a number of waved wires 31 arranged and secured in horizontal parallel relation with respect to each other in a frame 32 which is connected with a weight 33 by a stem 34. The stem 34 is pivotally secured to the frame 32 as at 35 and springs 36 tend to hold the parts in normal vertical position in the manner as clearly shown in Figure 6. A plurality of spurs 37 are formed on the bottom of the weights and these spurs are adapted to prevent the same from slipping or sliding in the soil when dropped from the hooked end of the arms 30 in a manner and for a purpose which shall be presently described.

A latch arm 38 is secured to each of the shafts 25 and spring influenced catches 39 have their housings pivotally secured to the front bar of the frame for cooperation with said latch arms as shown in Figures 4 and 5 of the drawings. Secured on the shafts 25 outwardly of the frame 1 and in a manner and for a purpose which will be later set forth are arms 40 which are adapted to engage the tappet arms 15 to prevent movement thereof when the shafts 25 have been moved to free the weights. Pivotally secured in the frame are pedals 41 which are connected with the arms 19 through the medium of cables 42 so that by depressing the pedals the arms 19 are sprung upwardly to be arranged in the path of and to be engaged by the tappet arms 15 for a purpose which will be presently apparent. The clutch parts 10 are provided with cooperating teeth as shown in Figure 1 and these teeth are of a shape and size whereby they will freely slip past each other when the shaft 5 is held against movement. The clutch parts may be manually actuated through the medium of a lever 43 which is connected to the parts carrying the sprockets 6 by pivoted links as shown in Figure 1 of the drawings, and this lever 43 is arranged so as to be in convenient reach of the operator of the planter.

The housings for the catches 39 are indicated by the reference numeral 44 and have extending from the rear ends thereof lugs 45 that receive pivot pins 46, the latter passing through ears 47 depending from brackets 48 which are substantially L-shape and have their short arms fixed to the front bar of the frame as best shown in Figures 4 and 5. Having one of their ends secured to the brackets 48 are leaf springs 49 while their opposite ends are secured to the housings to urge the latter to the position as shown in Figure 4, with the lugs 45 in engagement with the brackets which have depending therefrom abutment blocks 50 arranged in the path of like blocks 51 on the housings. The bodies of the catches 39 have converging cam faces formed on the outer end thereof, and these faces are arranged in the path of the latch arms 38 that terminate at their free ends in sharpened edges. The catches 39 are mounted for slidable movement in the housings and include stems 52 extending from the inner ends of the bodies for movement through guides 53 formed with the pivoted ends of the housings 44 and coil springs 54 have their end convolutions engageable with the bodies and the rear walls of the housings, the coil springs surrounding the stems as shown.

In Figure 4 the latch parts are shown in their normal position and they assume this position as long as the weights are carried by the arms 30, but when the shafts 25 are rotated to drop the weights, in a manner which will be presently set forth, it will be obvious that the latch arms 38 will be swung downwardly past the catches 39 as suggested by the dot and dash lines in Figure 4. When the weights are released from the arms 30, the springs 27 will urge the shafts 25 to their normal position, but the latch arms 38 while being moved to their normal position by the shafts 25 will engage the lower cam faces of the catches 39 and urge the catches inwardly against the springs 54, with the result the latch arms will be caught with their free ends disposed between the catches and the housing as shown in Figure 5, thereby the arms 30 will be held in a position to pick up the weights, when the machine has been turned about to start a new row. When the hooked ends of the arms 30 contact the wires 31 prior to the hooked ends picking up the weight, the shafts 25 are jarred, and due to the fact that slight downward pressure upon the latch arms 38 move the housings downwardly and the catches 29 inwardly, this jarring movement will release the latch arms from the catches and allow the springs 27 to rotate the shafts 25 to their normal position and therefore the arms 30 will pick up the weights.

From the above description and disclosure of the drawings, it is thought that it will be obvious that when the machine is in operation, the tappet arms 15 will be actuated by the travel of the machine across a field, and these tappet arms 15 engage the arms 16 to trip the same to cause the seeds in the seed boxes to be dropped in the usual manner. The weighted means which includes the frame 32 are held off the ground by means of the springs 27, which hold the shafts 25 with their arms 26 in engagement with the front bar of the frame 1 as clearly shown in Figure 1. When the end of a row is reached and the operator desires to drop one of the weighted means, he will depress the desired pedal 41 to bring the arm 19 actuated by the depressed pedal in the path of the tappet arms adjacent thereto, with the result one of the tappet arms will engage its arm 19 and cause the shaft 18 to be shifted against the tension of the springs 20 to place the gear 21 in mesh with its adjacent gear 23 so that the shaft 25 on the side actuated will be rocked, thus causing the arm 30 of the shaft 25 rocked to be inclined downwardly and to an extent sufficient to deposit its weighted means upon the ground.

When the weighted means has been dropped as above set forth, the pedal is then released, so as to free the shaft 25, it being obvious that when the shaft 18 is allowed to move to its normal position, the gear 21 will be disposed out of mesh with its gear 23. When the shaft 25 has been released, the spring 27 of the released shaft will cause the same to rotate in a direction opposite from that rotated by the gear 21 and due to the fact that the latch arm 38 has been moved past the catch 39 the latch arm will be raised until it is caught between the catch 39 and its housing as has been previously set forth, to prevent the shaft 25 from returning to its normal position and whereby the arm 30 will be held in a position to engage some of the wires 31 of the weighted means. The reverse movement of the shaft 25 takes place immediately upon releasing the pedal depressed, and when the shaft 25 is held through the medium of the latch arm 38 as shown in Figure 5, the arm 40 of the shaft 25 that is rocked will be disposed in the path of the tappet arms 15 and thereby the tappet arms will be moved from the position assumed when caught by the arms 19 through the medium of the shaft 5 to a position whereby they will be caught by the arms 40. The lever 43 may be thrown to operate the clutch mechanism when the arm 40 engages the tappet arms and thereby move the clutch member to an inactive position, however while the tappet arms are being held by the arm 19, the clutch parts can be allowed to slip as the arms 16 hold the tappet arms 15 momentarily or until the parts are operated to drop the weight.

After the planter has been turned to begin a new row, the arm 30 from which the weighted means was dropped before turning engages some or one of the respective wires 31 of the frame 32 for actuating the latch means as shown in Figures 4 and 5 in a manner which has been previously set forth so that the arm 30 will pick up the weighted means through the medium of one of the wires 31. When the shaft 25 that has been rocked is released by the disengagement of the latch arm 38 from the catch and its housing, it will assume its normal position and move the arm 40 out of the path of the tappet arm held thereby and allow for free movement of the tappet arms as will be apparent, whereby the machine can proceed to plant the next row after the lever 43 has been moved to put the clutch parts into active position.

It will be noted that the machine is provided with two weighted means, one at each side thereof as clearly shown in Figure 1, and the parts at one side of the machine drop and pick up the weighted means at one end of the field, and the parts at the other side drop and pick up the weighted means at the other end of the field and notwithstanding the fact that the weights are provided with spurs 37, they also must have a low center of gravity, so that there is no danger of it upsetting when dropped, as it is necessary that it always be in an upright position whereby it can be picked up by the arms 30. By employing these means, it will be obvious that the machine will plant seeds in aligned rows without the use of check wires.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A corn planter of the character described comprising a wheeled frame, seed dropping mechanism carried thereby, tappet arms for actuating the seed dropping mechanism, means for rotating the tappet arms from the wheels of the planter, spring pressed and manually operated clutch means included in the first mentioned means, a pair of rock shafts journaled in the frame, weight carrying arms secured to the said rock shafts, weighted means adapted to be carried by said arms and to be dropped and picked up thereby, springs for holding the rock shafts with the weight carrying arms and their weighted means in raised position, a stop arm on each rock shaft and normally engaging the frame, a latch arm on each rock shaft, spring latched means on the frame and being arranged in the path of the latch arm, an arm on each rock shaft for engaging the tappet arms to prevent actuation thereof, means for moving the last mentioned arm into engagement with its tappet arm by rotating the rock shafts, means included in the rock shaft rotating means, to momentarily engage the tappet arms, whereby the latter will put the rock shaft rotating means into operation, and manually operated means for actuating the shaft rotating means.

In testimony whereof I affix my signature.

LLOYD N. RAHN.